Oct. 8, 1940.  R. KÜMMICH  2,216,950
DIRECTION FINDER
Filed May 18, 1938
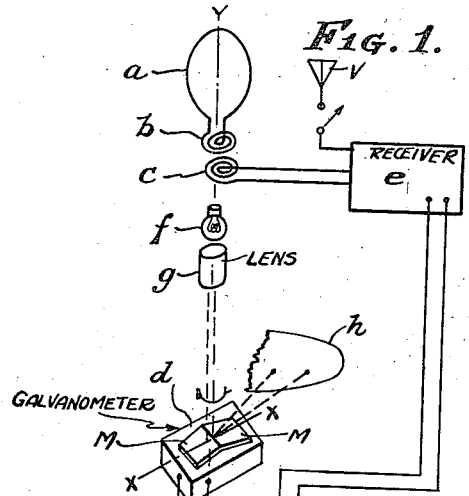
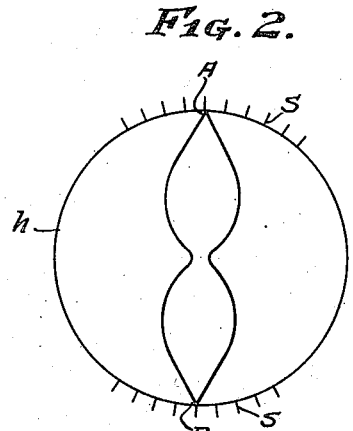
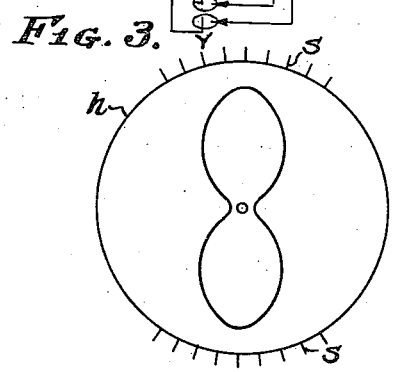
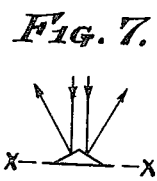
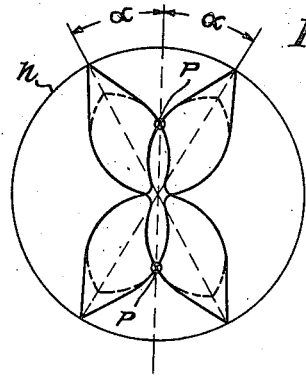
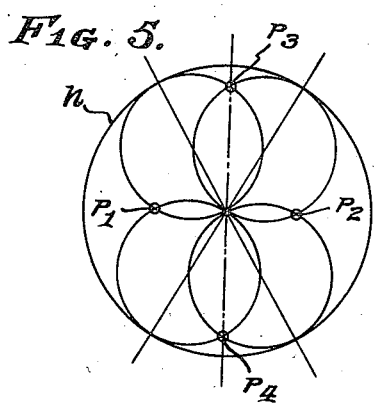
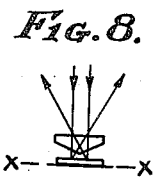
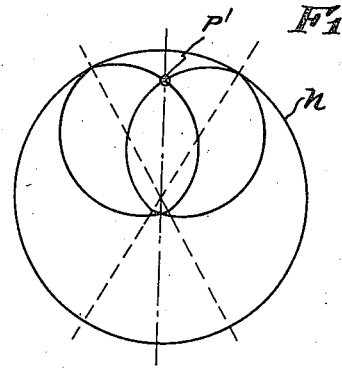
Inventor
Richard Kümmich
By
Attorney Patented Oct. 8, 1940

2,216,950

UNITED STATES PATENT OFFICE 2,216,950

DIRECTION FINDER

Richard Kümmich, Berlin-Tempelhof, Germany, assignor to Telefunken Gesellschaft für Drahtlose Telegraphie m. b. H., Berlin, Germany, a corporation of Germany Application May 18, 1938, Serial No. 208,561
In Germany June 26, 1937

5 Claims. (Cl. 250—11)

The present invention relates to a direction finder with direct indication in which a rotating receiving system sensitive as regards directional effects such as a frame is connected to a receiver whose output potential controls a synchronously rotating illumination organ such as for instance the electron ray of a Braun tube or the light ray of an oscillograph, whereby the polar diagram of a received transmitter is rendered visible. The object of the present invention is to provide an especially designed illumination organ affording a sharp recording of the bearing also in such cases in which hitherto only an indistinct polar diagram could be obtained.

This invention will be better understood from the following description when considered in connection with the accompanying drawing, in which Figure 1 illustrates an embodiment of my invention; Figures 2 and 3 are polar diagrams of response patterns according to the prior art; Figures 4 and 5 are polar diagrams of the response patterns of the improved system illustrated in Figure 1; Figure 6 is a polar diagram of a modified response pattern; and Figures 7 and 8 are views of reflecting mirrors which may be used in accordance with this invention.

The known arrangements for direction finders with direct indication which are operated with a rotating receiving system sensitive to directional effects are principally constructed throughout approximately in the manner shown in Figure 1 except that a single flat reflecting mirror of the type usually used on mirror galvanometers is employed in the place of the special mirror M which is illustrated. Such a flat mirror will produce but a single light beam and but a single spot. The two beams of light which are provided in accordance with the present invention produce a unique indication whose advantages will be explained subsequently.

Referring to Fig. 1, and considering but one half of the mirror M and one beam of light, the operation of the device of the prior art will first be explained. Item $a$ represents a rotating frame antenna which may also be substituted by the rotating coil of a goniometer and which rotates about a vertical axis Y—Y. The frame is connected to a receiver $e$ either across slip rings or preferably across a rotational symmetrical inductive coupling consisting of the simultaneously rotating coil $b$ and fixed coil $c$. The receiver output is connected to the synchronously rotating mirror galvanometer $d$ which may for instance be mounted on the same shaft in common with the frame $a$ so as to rotate about the vertical axis Y—Y. A pencil of light rays emanating from the bulb $f$ passes through the optic $g$ and falls upon the mirror of the instrument $d$, said mirror being assumed to be flat and being rotatable in the instrument about a horizontal axis X—X and being adjustable about this axis in such manner that the reflected light ray forms with the axis of rotation Y—Y a certain angle when no current flows in the instrument whereby a luminous point is traced on the frosted glass disc $h$ a portion of which is shown. Upon rotation about the Y—Y axis a luminous circle appears on said frosted glass disc. If current flows in the mirror instrument, this angle changes and the luminous point moves radially towards the inside or outside in accordance with the direction of the current. Thus, if the frame rotates in the alternating magnetic field of any transmitter, the luminous point is situated in the two minimum response positions of the frame on the zero circle whereas in the other positions said luminous point has moved in the radial direction in proportion to the potential induced in the frame. Thus, when the point is deviated towards the inside the frosted glass disc reveals a picture according to Figure 2. Herein, the points A and B are the two zero response positions of the frame which characterize the direction of the transmitter. This direction can then be read directly from a suitable scale S arranged about the circumference of the disc. This picture having the configuration of a double leaf with two points corresponds to the twin circle diagram in which the amplitudes are plotted relative to a center point instead of a zero circle.

As compared with the principal arrangement represented by Figure 1, other direction finders with direct indication may be arranged with modifications of the less essential features. For instance, in place of the frame, another rotating receiving organ sensitive to directional effects (Adcock antenna) or the finder coil of a goniometer may be employed. The rotating mirror instrument need not necessarily be mounted on the rotating shaft of the frame but may be driven separately. Furthermore, in place of a rotating mirror instrument, a Braun tube may be used whose electron ray rotates in synchronism and will be deviated in the radial direction by the output potential of the receiver.

The ideal polar diagrams as shown in Figure 2 can in but few cases be obtained with the sharp points shown. The characteristic broadening of the null points is shown in Fig. 3. The reason for this condition may be a so-called blurring such as caused for instance by an antenna effect of the frame or by any reactive radiator in the vicinity of the frame. In these cases, one of the minima can be sharpened in the known manner by means of an auxiliary antenna, but in this case an additional operating organ is required. Another cause for indistinct minima may be traced to the inner or outer disturbance level which obviously becomes visible just when the useful amplitude to be received passes through zero. In this case the minima can as such not be sharpened, and this phenomenon rather presents the limit of the possibility of taking bearing. Finally, the minima are always indistinct if the mirror instrument is fed with D. C. because any detector operates in a quadratic fashion at very small amplitudes. In each case the accuracy of the direction finding is diminished owing to indistinct minima.

In accordance with the invention means are provided through which an accurate direction finding is possible also in cases in which the minima are indistinct and irrespective of the cause of this lack of sharpness. The invention is based upon the fact that the sinusoidal rise starting from the minimum is disturbed only in the direct vicinity of the minimum, while the higher values of the current are hardly affected at all by the disturbance currents, since the addition of line current and disturbance current follows the square.

In accordance with the invention in place of the disturbed minimum these but slightly disturbed flanks of the rise from the minimum are employed for finding the direction, namely in that from one and the same transmitter two identical polar diagrams are rendered visible or two identical pictures are produced from one and the same polar diagram and which are displaced relative each other by a certain angle while for the purpose of characterizing the direction of the transmitter the intersection points of the diagram parts are employed which are situated symmetrically to the line bisecting the angle.

The invention will now be described in greater detail in reference to the example shown in Figure 4. A polar diagram according to Figure 2 will be considered at first. This diagram is assumed to be displaced by the angle $d$ in the clockwise direction. A second, identical diagram displaced relative to the former diagram in the opposite direction by the angle $2d$ is rendered visible at the same time. Therefore, the intersection points P indicate the direction of the transmitter.

Now, if for any reasons the minima are not sharp, such as shown in dash lines in Figure 4, this condition has no effect upon the sharpness of the intersection point P except that at the most the intersection point will be displaced in the radial direction by a small distance. Therefore, the recorded bearing is distinct though the minima are indistinct. If the lack of sharpness of the minima is due to a blurring effect, this signifies that in the arrangement according to the present invention a special operating organ can be dispensed with and if the lack of sharpness of the minimum originates with the disturbance level the direction finder, according to the present invention, affords greater accuracy, i. e., it is more sensitive than the known direction finder, in other words, an accurate taking of the bearing is now also possible in case of less powerful transmitters. The disadvantage of a quadratic rectification which in the hitherto known arrangements produced inaccuracy in the recording of the bearing, has no effect upon the arrangement according to the invention. It is obvious that the ray may also be deviated in the direction from the inside to the outside in which case a diagram according to Figure 5 will be obtained whereby for the purpose of characterizing the direction upon the transmitter either the intersection points $P_1P_2$ or the intersection points $P_3P_4$ (maximum indicator) may be utilized. Finally, the arrangement according to the invention also affords the solution of the problem of an unequivocally sharp recording of the direction. In this case it is only necessary to utilize in place of two twin circle diagrams, two displaced cardioides (see Figure 6) by adding to the potential of the frame a potential that is independent of direction by providing a vertical antenna V in the well known manner so that although each cardioid has as such but an indistinct minimum, an unequivocally sharp recording of the bearing will be obtained by the intersection point P'.

In order to provide two displaced polar diagrams or two displaced pictures of a polar diagram the following steps can be taken: If the indicator is a Braun tube, the receiver instead of controlling a single electron ray can control two rays in a manner known as such whereby each ray records a polar diagram. Where a simultaneously rotating mirror instrument equipped with a frosted disc or screen is employed, the illuminating apparatus can be devised such that this instrument influences at the same time two rays of light forming a certain angle with each other. These two rays of light may be obtained, for instance, by two sources of light which illuminate the mirror of the instrument symmetrically from different directions or the second source of light may be substituted by a mirror arranged in the symmetry axis, or the mirror of the instrument may consist of two parts forming an angle with each other as shown in the general arrangement of Fig. 1, or, as to the mirror alone, as shown in Fig. 7, whereby the departing ray is split up into two diverging rays, or a double prism may be arranged directly in front of the mirror of the instrument by means of which the arriving ray of light will be split up into two parts which fall upon the mirror under different angles and will be converted into two diverging rays following a reflection and repeated passage through the prism (Figure 8). It is obvious that optical means (lenses) through which the two diverging rays must pass on their way to the frosted disc, must be provided in pairs.

Thus, referring to Fig. 1, when the flat mirror of the prior art is replaced by a double mirror as shown, or when two separate light sources (not illustrated) are provided and a single flat mirror is used, two luminous spots appear on the disc $h$ which are separated by any desired angle $2\alpha$. As the mirror M vibrates about the X—X axis in response to the intensity of the signal from the frame $a$, the spots move radially and trace the double curves shown in Figs. 4, 5 and 6.

I claim as my invention:

1. A direction finder which includes a rotating directional receiving system, a source of light and means adapted to produce a pair of divergent beams of light, means for rotating said beams about an axis which lies in the plane bisecting the angle of divergence, said rotation being synchronized with the rotation of said receiving means, a screen interposed in the path of said beams, and means for deflecting said beams in accordance with the received signal intensity to trace on said screen a pair of intersecting polar diagrams whose points of intersection correspond to predetermined angular positions of said directional receiving system.

2. A device of the character described in claim 1 in which said means adapted to produce a pair of divergent beams of light comprises two reflecting surfaces at an angle to each other.

3. A device of the character described in claim 1 in which said means adapted to produce a pair of divergent beams of light comprises a reflecting surface which is illuminated symmetrically with respect to the normal of the surface and includes a double prism in the plane of symmetry.

4. A direction finder which includes a rotating directional receiving system and means for producing a pair of synchronously rotating divergent beams, said beams being rotated about an axis which lies in the plane bisecting the angle of divergence, a screen normal to said axis on which said beams trace concentric circles of equal diameter, and means for deflecting said beams radially in accordance with the received signal intensity whereby said beams trace intersecting polar diagrams whose points of intersection correspond to predetermined angular positions of said rotating directional receiving system.

5. A direction finder which includes a rotating directional antenna, means for producing a pair of diverging beams, means for rotating said beams about a common bisecting axis in synchronism with the rotation of said antenna, means for indicating the position of said beams, and means for deflecting said beams in accordance with the intensity of signal currents induced in said antenna.

RICHARD KÜMMICH.